(12) United States Patent
Tammannagari et al.

(10) Patent No.: US 12,248,544 B2
(45) Date of Patent: Mar. 11, 2025

(54) USER AUTHENTICATION BASED ON BIOMETRIC DATA

(71) Applicant: Hewlett-Packard Development Company, L.P., Spring, TX (US)

(72) Inventors: Sailesh Kumar Tammannagari, Palo Alto, CA (US); Rafael Dal Zotto, Porto Alegre (BR)

(73) Assignee: Hewlett-Packard Development Company, L.P., Spring, TX (US)

( * ) Notice: Subject to any disclaimer, the term of this patent is extended or adjusted under 35 U.S.C. 154(b) by 312 days.

(21) Appl. No.: 17/796,443

(22) PCT Filed: Feb. 20, 2020

(86) PCT No.: PCT/US2020/019099
§ 371 (c)(1),
(2) Date: Jul. 29, 2022

(87) PCT Pub. No.: WO2021/167615
PCT Pub. Date: Aug. 26, 2021

(65) Prior Publication Data
US 2023/0051980 A1    Feb. 16, 2023

(51) Int. Cl.
*G06F 21/32* (2013.01)
*G06F 21/31* (2013.01)

(52) U.S. Cl.
CPC .......... *G06F 21/32* (2013.01); *G06F 21/316* (2013.01); *G06F 2221/2115* (2013.01)

(58) Field of Classification Search
CPC . G06F 21/32; G06F 21/316; G06F 2221/2115
See application file for complete search history.

(56) References Cited

U.S. PATENT DOCUMENTS

| 10,111,093 | B2 | 10/2018 | Harthattu et al. |
| 10,303,864 | B2 | 5/2019 | Blake et al. |
| 10,339,288 | B2 | 7/2019 | Rebelo et al. |
| 2009/0240949 | A9 | 9/2009 | Kitchens et al. |

(Continued)

FOREIGN PATENT DOCUMENTS

| CN | 106339610 A | 1/2017 | |
| CN | 107018121 A * | 8/2017 | ........... G02B 27/017 |

(Continued)

*Primary Examiner* — Khoi V Le
(74) *Attorney, Agent, or Firm* — Quarles & Brady LLP

(57) ABSTRACT

In an example implementation according to aspects of the present disclosure, a system receives behavioral biometric data associated with a user of a computing device. The system determines whether an identity of the user is authenticated based on a comparison of the received behavior biometric data and historical behavioral biometric data associated with the user of the computing device. In response to determining that the identity of the user is not authenticated based on the comparison of the received behavioral biometric data and the historical behavioral biometric data, the system receives physiological biometric data associated with the user. The system determines whether the identity of the user is authenticated based on a comparison of the received physiological biometric data and historical physiological biometric data associated with the user of the computing device.

15 Claims, 7 Drawing Sheets

(56) References Cited

U.S. PATENT DOCUMENTS

| | | | | |
|---|---|---|---|---|
| 2010/0162386 | A1* | 6/2010 | Li | G06F 21/32 726/19 |
| 2017/0034183 | A1* | 2/2017 | Enqvist | G06F 21/316 |
| 2017/0279800 | A1* | 9/2017 | Castinado | G06F 21/32 |
| 2019/0133474 | A1* | 5/2019 | Longinotti-Buitoni | G06F 3/017 |

FOREIGN PATENT DOCUMENTS

| | | |
|---|---|---|
| CN | 109376725 A | 2/2019 |
| WO | 2014/205148 A1 | 12/2014 |

\* cited by examiner ns may
occur after the user has logged into their account and are in
an active session, such as when a user begins a user session
on a device but then leaves the device and another user
begins using the user's account.

USER AUTHENTICATION BASED ON BIOMETRIC DATA

BACKGROUND

Computing devices including personal computers often require authentication of a user accessing the computing device. A user's identity may be authenticated using a variety of security features.

BRIEF DESCRIPTION OF THE DRAWINGS

Many aspects of the disclosure can be better understood with reference to the following drawings. While several examples are described in connection with these drawings, the disclosure is not limited to the examples disclosed herein.

DETAILED DESCRIPTION

The disclosure described herein presents a system, method, and storage medium storing instructions that allows the identity of the active user to be authenticated throughout an active user session. The system may receive behavioral biometric data and determine whether an identity of the user is authenticated based on a comparison of the received behavior biometric data and historical behavioral biometric data associated with the user of the computing device. In response to determining that the identity of the user is not authenticated based on the comparison of the received behavioral biometric data and the historical behavioral biometric data, the system may receive physiological biometric data associated with the user. The system may then determine whether the identity of the user is authenticated based on a comparison of the received physiological biometric data and historical physiological biometric data associated with the user of the computing device.

Personal computers are currently being engineered with a variety of security features to protect, detect, and recover from attacks. Devices may be built with hardware-enforced security features and layers of protection that play important roles in proactively identifying and preventing security threats as well as quickly recovering security for a user in the event of a breach. An example of a security threat may be when someone other than the user logs into the user's account. However, other examples of security threats may occur after the user has logged into their account and are in an active session, such as when a user begins a user session on a device but then leaves the device and another user begins using the user's account.

While many systems may restrict access to a user by requiring alphanumerical passwords or numerical Personal Identification Number (PIN) at the initiation of an active user session, these methods do not offer persistent verification of the user's identity throughout the session usage. Furthermore, Multi-Factor Authentication (MFA) offers an additional layer of authentication in which a computer user is granted access only after successfully presenting two or more pieces of evidence to an authentication mechanism.

In this common scenario, the operational system security layer may be extended by offering an on-going authentication system that uses a combination of biometric data to assert the identity of the active user. Biometrics cover a variety of technologies in which unique identifiable attributes of an individual are used for authenticating an identity of the user seeking to access a device or other system. The biometric data could include behavioral biometric data and/or physiological biometric data. A user's identification may be constantly (and transparently) checked using a combination biometric data associated with the user while using the given device.

Figure 1:
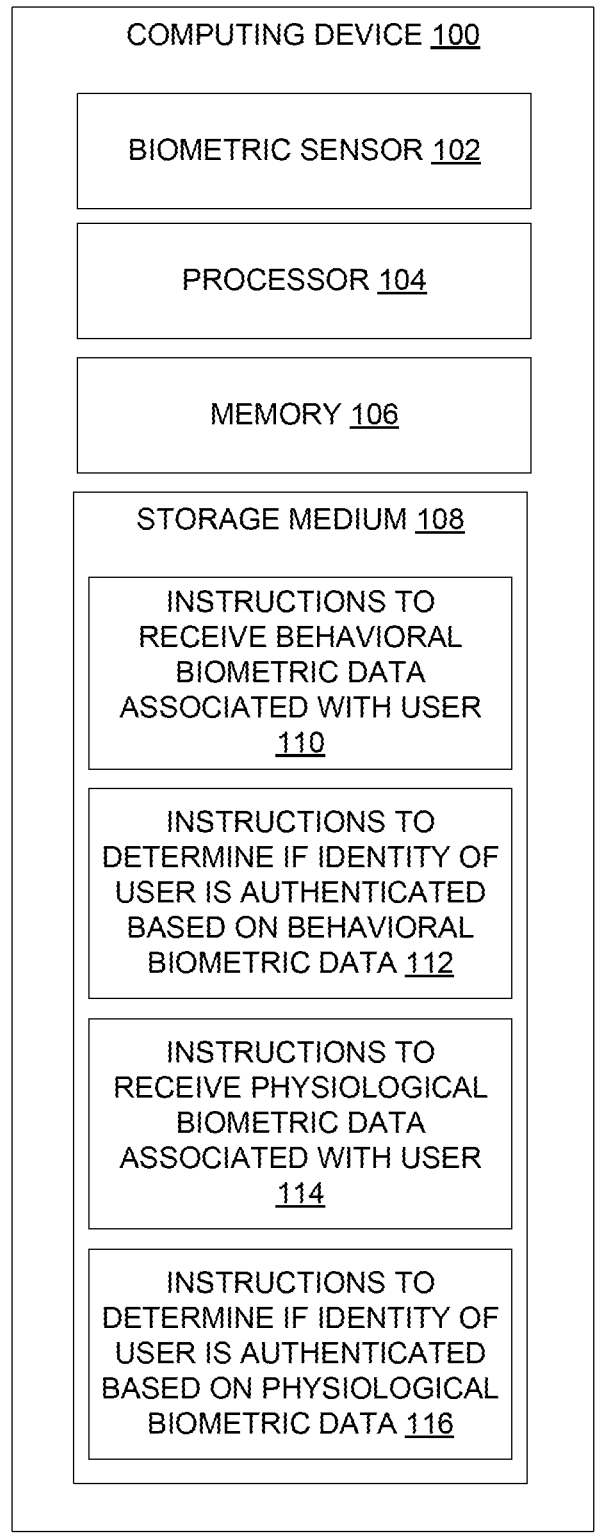
FIG. 1 illustrates a block diagram of a computing system for authenticating a user based on biometric data, according to an example.

FIG. 1 illustrates a block diagram of computing system 100 for authenticating a user based on biometric data, according to an example. Computing system 100 depicts biometric sensor 102, processor 104, memory 106, and storage medium 108. As an example of computing device 100 performing its operations, storage medium 108 may include instructions 110-116 that are executable by processor 104. Thus, storage medium 108 can be said to store program instructions that, when executed by processor 104, implement the components of computing device 100.

In particular, the executable instructions stored in storage medium 108 include, as an example, instructions to receive behavioral biometric data associated with a user (110) and instructions to determine if an identity of a user is authenticated based on behavioral biometric data (112). The executable instructions stored in storage medium 108 also include, as an example, instructions to receive physiological biometric data associated with a user (114) and instructions to determine if an identity of a user is authenticated based on physiological biometric data (116).

The instructions to receive the behavioral biometric data associated with the user (110) represent program instructions that when executed by processor 104 cause computing device 100 to receive behavioral biometric data from biometric sensor 102 that may be inputted by the user of computing device 100. The behavioral biometric data may be keyboard keystrokes, mouse movement, and processes of how a user opens a program or file. As an example, biometric sensor 102 may detect which type of mouse hardware, such as an external peripheral or a trackpad. Biometric sensor 102 may also measure a range of coordinates of the mouse projected on a Graphical User Interface (GUI) and a times associated with the measured coordinates. The measured coordinates and time may then be communicated to computing device 100 to determine a velocity and/or intensity of the user's mouse movements. Likewise, biometric sensor 102 may measure mouse clicks which may be used to determine a mouse click velocity of the user during an active user session.

The instructions to determine if an identity of a user is authenticated based on behavioral biometric data (112)

represent program instructions that when executed by processor 104 cause computing device 100 to compare the received behavioral biometric data with historical behavioral biometric data and determine whether the received behavioral biometric data and historical behavioral biometric data are sufficiently similar to authenticate the user's identity.

Any given computer resource can be shared among different users. Likewise, each user profile may have its own unique behavioral and physiological biometric data. Therefore, computing device 100 may be associated with multiple user profiles where each user profile has its own unique biometric behavioral data reflecting how keyboard and mouse are used, what the average keystroke speeds are, how often or frequent the user uses the mouse, how the user launches a document or file, etc.

This biometric behavioral data may be stored as the historical behavioral biometric data. The system can maintain the biometric data in a local storage location, in a data repository, or some other data storage mechanism which allows the historical behavioral data to be retrieved at a later time and used to compare with newly received biometric data to authenticate the user in real-time.

The instructions to receive the physiological biometric data associated with the user (114) represent program instructions that when executed by processor 104 cause computing device 100 to receive physiological biometric data from biometric sensor 102 that may be inputted by the user of computing device 100. The physiological biometric data may be data used for facial recognition, fingerprint identification, iris print identification, Deoxyribonucleic Acid (DNA) identification, voice recognition, etc. As an example, biometric sensor 102 may detect that a user has joined a phone call. Biometric sensor 102 may measure small samples of speech sentences of the user.

The instructions to determine if an identity of a user is authenticated based on physiological biometric data (116) represent program instructions that when executed by processor 104 cause computing device 100 to compare the received physiological biometric data with historical physiological biometric data and determine whether the received physiological biometric data and historical physiological biometric data are sufficiently similar to authenticate the user's identity.

As an example, the comparison of the received physiological biometric data and the historical physiological data by be performed using machine learning models. For example, a data repository may store both the behavioral and physiological biometric data on an on-going basis. Once a threshold amount of biometric data has been accumulated, a machine learning system can user artificial intelligence to determine patterns of the user and determine whether the received biometric data fits within the determined pattern of biometric data associated with the user.

Storage medium 108 represents any number of memory components capable of storing instructions that can be executed by processor 104. As a result, memory 106 may be implemented in a single device or distributed across devices. Likewise, processor 104 represents any number of processors capable of executing instructions stored by storage medium 108. Processor 104 may be fully or partially integrated in the same device as processor 104, or processor may be separate but accessible to that device and processor 104.

Figure 2:
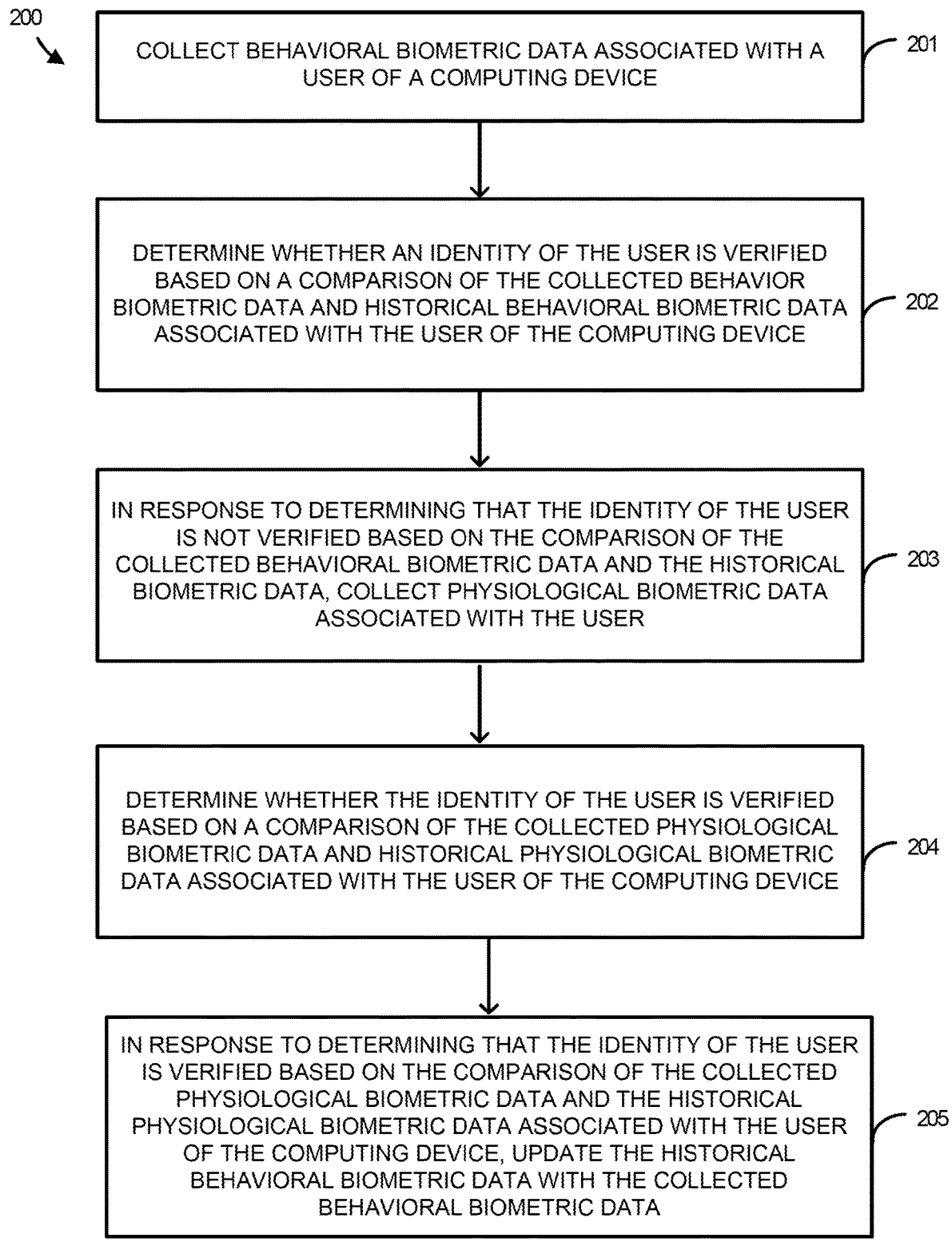
FIG. 2 illustrates a flow diagram of a process to verify an identity of a user based on biometric data, according to an example.

FIG. 2 illustrates a flow diagram of process 200 to verify an identity of a user based on biometric data, according to an example. Some or all of the steps of process 200 may be implemented in program instructions in the context of a component or components of an application used to carry out the user verification feature. Although the flow diagram of FIG. 2 shows a specific order of execution, the order of execution may differ from that which is depicted. For example, the order of execution of two of more blocks shown in succession by be executed concurrently or with partial concurrence. All such variations are within the scope of the present disclosure.

Referring parenthetically to the steps in FIG. 2, a process collects (201) behavioral biometric data associated with a user of a computing device. Behavioral biometric data may be keystroke dynamics, mouse movement data, frequency of mouse usage data, file launch data, etc. In an example, keystroke measurements inputted by a user in an active session may be collected. The keystroke measurements may include latency between consecutive keystrokes, durations of the keystroke (e.g., a hold-time on the keys), an overall typing speed, and/or a frequency of errors (e.g., how often the user uses the backspace key). In other examples, the keystroke data may include user habits of using additional keys on a keyboard (e.g., writing numbers with the number pad), an order that the user using when pressing keys to write a capital letter, and/or a force used when typing a special key (e.g., the space bar).

In some examples, process 200 may be initiated in response to a usage verification by the user to begin an active user session. For example, a user may enter a PIN or provide an alphanumeric password to login on a computing device. Process 200 would then begin to collect real-time user behavioral biometric data, as described in the step above (201). It should also be noted that process 200 may be running continuously, be run at predefined intervals, be run at random intervals, or be triggered to run in response to a user activity or absence of activity for a period of time. For example, process 200 may be triggered after a user has initiated an active session, leave for a threshold time interval, and return to the active session. In this example, the absence may not be long enough to trigger an active user verification method (e.g., re-login with password or PIN), but may be long enough to trigger the system to passively verify the identity of the user using process 200.

In a next operation, the process determines (202) whether an identity of the user is verified based on a comparison of the collected behavior biometric data and historical behavioral biometric data associated with the user of the computing device. The historical behavioral biometric data may be maintained in a cloud-based data repository to be ingested by a machine learning system. Since behavioral biometric data reflects human usage, it is expected that behaviors may vary within a threshold amount and may change overtime. Therefore, machine learning algorithms and techniques may be used to determine a user pattern and compare the collected behavioral biometric data and historical behavioral biometric data using the user pattern.

In further examples, multiple user profiles may be maintained in associated with a device. In this example, each user may have their own usage data which reflects their behavioral biometric data and historical physiological biometric data associated with an individual user. The dataset for each user profile holds the underlying specifications that denote how the user's behavior usage reflects them.

In response to determining that the identity of the user is not verified based on the comparison of the collected behavioral biometric data and the historical behavioral biometric data, the process collects (203) physiological biometric data associated with the user. The physiological biometric data may be facial recognition data, voice recognition data, and fingerprint recognition data. As an example, a web camera used during an online conference call may take simple snapshots of the user sitting in from of the device.

The process then determines (204) whether the identity of the user is verified based on a comparison of the collected physiological biometric data and historical physiological biometric data associated with the user of the computing device. The historical physiological biometric data may be maintained in a cloud-based data repository to be ingested by a machine learning system. A machine learning system may then use algorithms and techniques to compare the collected physiological biometric data and historical physiological biometric data associated with the user. For example, a digital image taken of the user during the active session may be compared with a set of digital images of the user taken over time. Facial recognition techniques may then be applied to determine whether the user currently in front of the webcam is the authenticated user of the user profile. The identity of the user may be verified by determining that the recently collected physiological biometric data matches the expected pattern to a specified degree.

In a final operation, in response to determining that the identity of the user is verified based on the comparison of the collected physiological biometric data and the historical physiological biometric data associated with the user of the computing device, the process updates (205) the historical behavioral biometric data with the collected behavioral biometric data. Since the behavioral biometrics associated with a user may evolve, the system should be able to adapt and grow the user's profile of behavioral biometric data. In some examples, the profile may be updated with new sets of behavioral biometric data and older sets of behavioral biometric data may be removed. This allows the system to continuously learn new behaviors of the user and timely reflect the changes to models used to authorize the identity of the user.

In other examples, in response to determining that the identity of the user is not verified based on the comparison of the collected physiological biometric data and the historical physiological biometric data associated with the user of the computing device, a mitigating action is performed on the computing device. The mitigation action may be a lock down of the computing device, a forced re-login by the user of the computing device, or a notification to a third party indicating the determination that the identity of the user is not verified.

Figure 3:
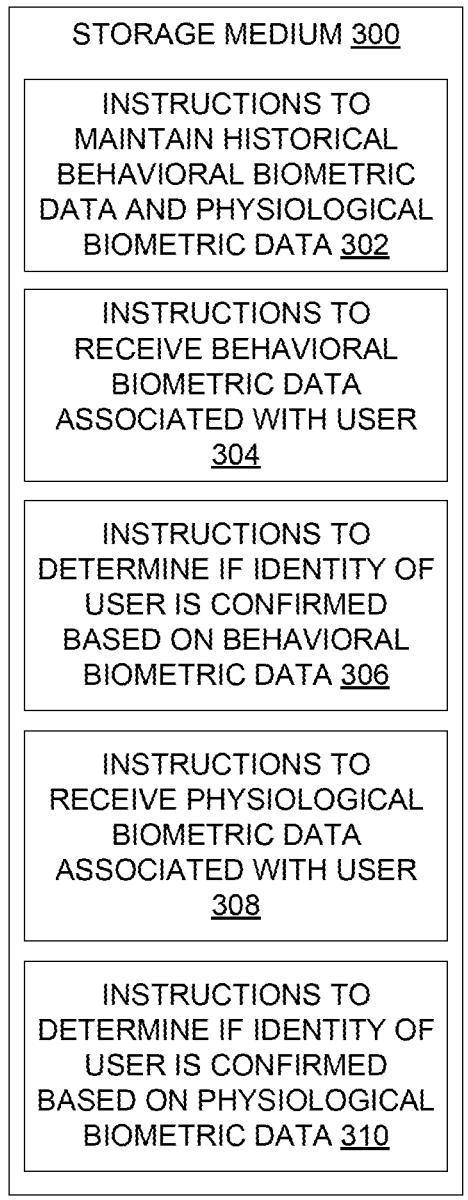
FIG. 3 illustrates a block diagram of a non-transitory storage medium storing machine-readable instructions to confirm an identity of a user based on biometric data, according to an example.

FIG. 3 illustrates a block diagram of non-transitory storage medium 300 storing machine-readable instructions that upon execution cause a system to confirm an identify of a user based on biometric data, according to an example. Storage medium is non-transitory in the sense that is does not encompass a transitory signal but instead is made up of at least one memory component configured to store the relevant instructions.

The machine-readable instructions include instructions to maintain historical behavioral biometric data and historical physiological data associated with a user (302). The machine-readable instructions also include instructions to receive behavioral biometric data associated with the user (304) and instructions to determine whether the identity of the user is confirmed based on a comparison of the received behavioral biometric data and the historical behavioral biometric data (306). Furthermore, the machine-readable instructions include instructions to receive physiological biometric data associated with the user (308) and instructions to determine whether the identity of the user is confirmed based on a comparison of the received physiological biometric data and the historical physiological biometric data (310).

In this example, physiological biometric data may be received regardless of whether the user's identity is confirmed using the behavioral biometric data comparison. In this example, the confirmation of the user's identity may be performed using both the behavioral biometric data and the physiological biometric data associated with the user. Furthermore, the historical behavioral biometric data may be updated with the recently received behavioral biometric data in response to each confirmation of the user, regardless of whether the identity of the user is confirmed using the behavioral biometric data or the physiological biometric data. Similarly, the historical physiological biometric data may be updated with the recently received physiological biometric data in response to each confirmation of the user, regardless of whether the identity of the user is confirmed using the behavioral biometric data or the physiological biometric data. In this manner, the user's profile is continuously updated with the new biometric data sets when the user's identity is confirmed in at least one verification technique.

In yet another example, the process may throw a user behavior challenge to the user based up the percent of confidence an artificial intelligence module is building about the user. Further in this example, if the user passes the behavior challenge the system will enable all channels to source user biometric data and learn the user's new behavior and update the system.

In one example, program instructions 302-310 can be part of an installation package that when installed can be executed by a processor to implement the components of a computing device. In this case, non-transitory storage medium 300 may be a portable medium such as a CD, DVD, or a flash drive. Non-transitory storage medium 300 may also be maintained by a server from which the installation package can be downloaded and installed. In another example, the program instructions may be part of an application or applications already installed. Here non-transitory storage medium 300 can include integrated memory, such as a hard drive, solid state drive, and the like.

Figure 4:
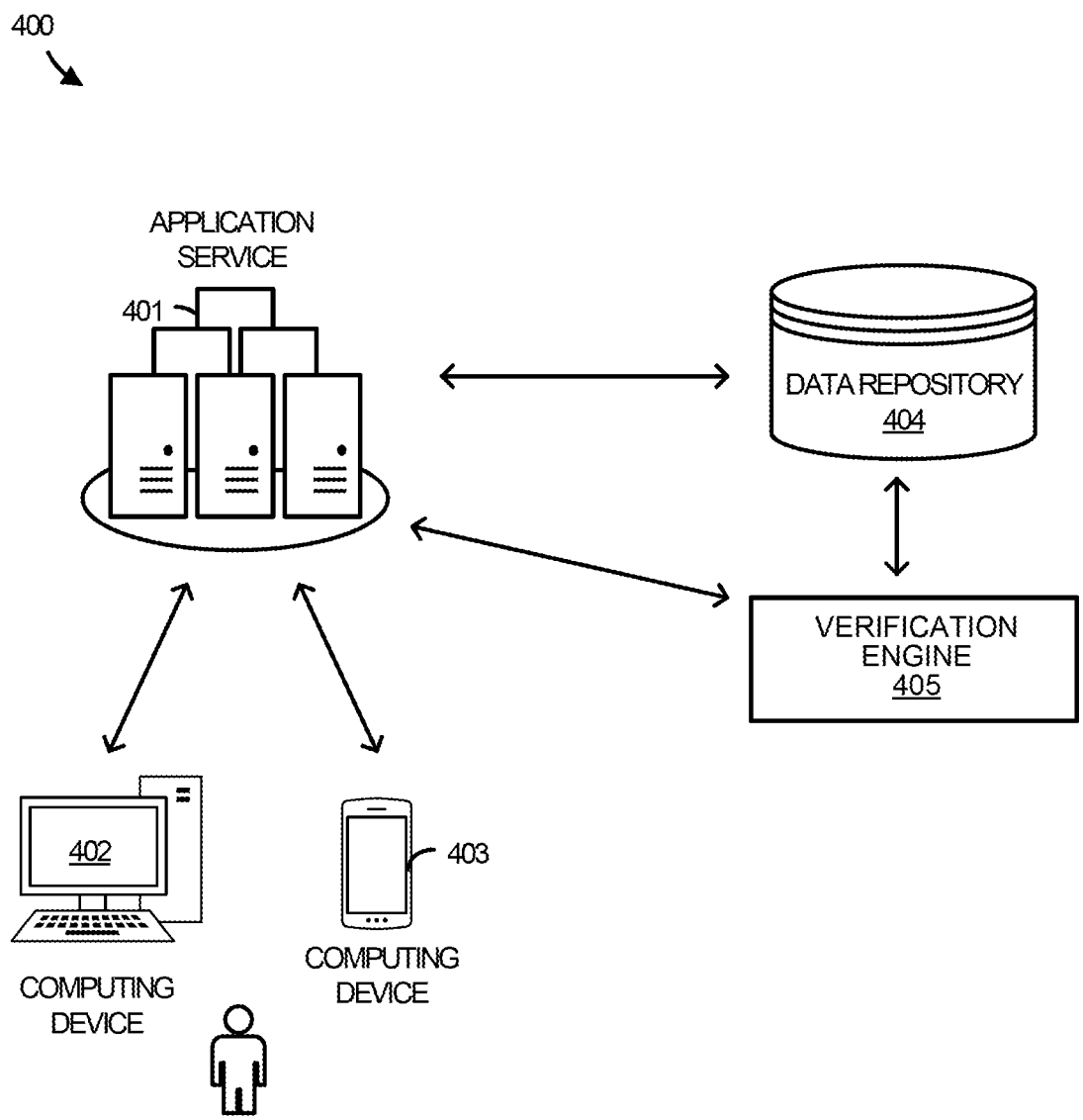
FIG. 4 illustrates an operational architecture of a system for authenticating a user based on biometric data, according to another example.

FIG. 4 illustrates an operational architecture of a system for authenticating a user based on biometric data, according to another example. FIG. 4 illustrates operational scenario 400 that relates to what occurs when biometric data is stored in a data repository and the user is authorized using machine learning algorithms or techniques in a verification engine. Operational scenario 400 includes application service 401, computing devices 402-403, data repository 404, and verification engine 405.

Figure 7:
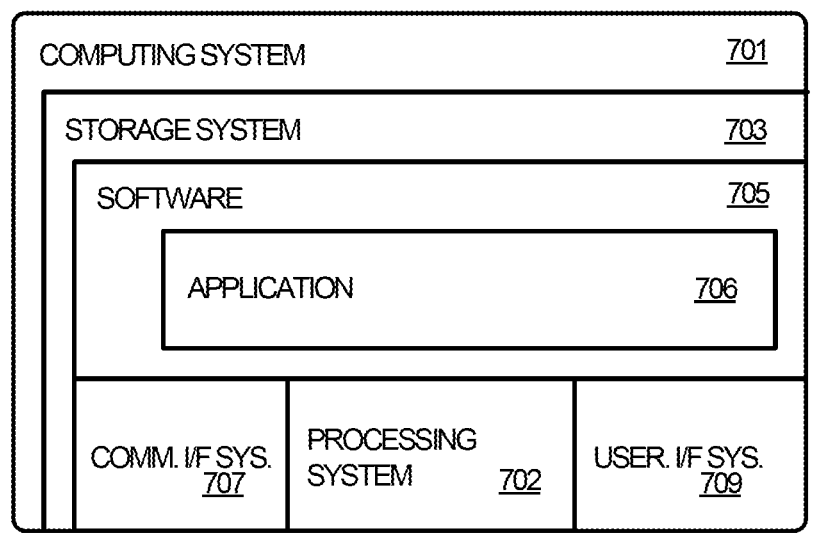
FIG. 7 illustrates a block diagram of a computing system for authenticating a user based on biometric data, according to some examples.

Application service 401 is representative of any device capable of running an application natively or in the context of a web browser, streaming an application, or executing an application in any other manner. Examples of application service 401 include, but are not limited to, personal computers, mobile phones, tablet computers, desktop computers, laptop computers, wearable computing devices, or any other form factor, including any combination of computers or variations thereof. Application service 401 may include various hardware and software elements in a supporting architecture suitable for performing process 500. One such representative architecture is illustrated in FIG. 7 with respect to computing system 701.

Application service 401 also includes a software application or application component capable of authenticating a user in accordance with the processes described herein. The software application may be implemented as a natively installed and executed application, a web application hosted in the context of a browser, a streamed or streaming application, a mobile application, or any variation or combination thereof.

Data repository 404 maintains and tracks biometric data for a user. The biometric data may be behavioral biometric data, physiological biometric data, or a combination of biometric data associated with a user. Data repository 404 may maintain a variety of user profiles which are associated with a variety of computing devices, such as computing device 302 and computing device 303.

Figure 5:
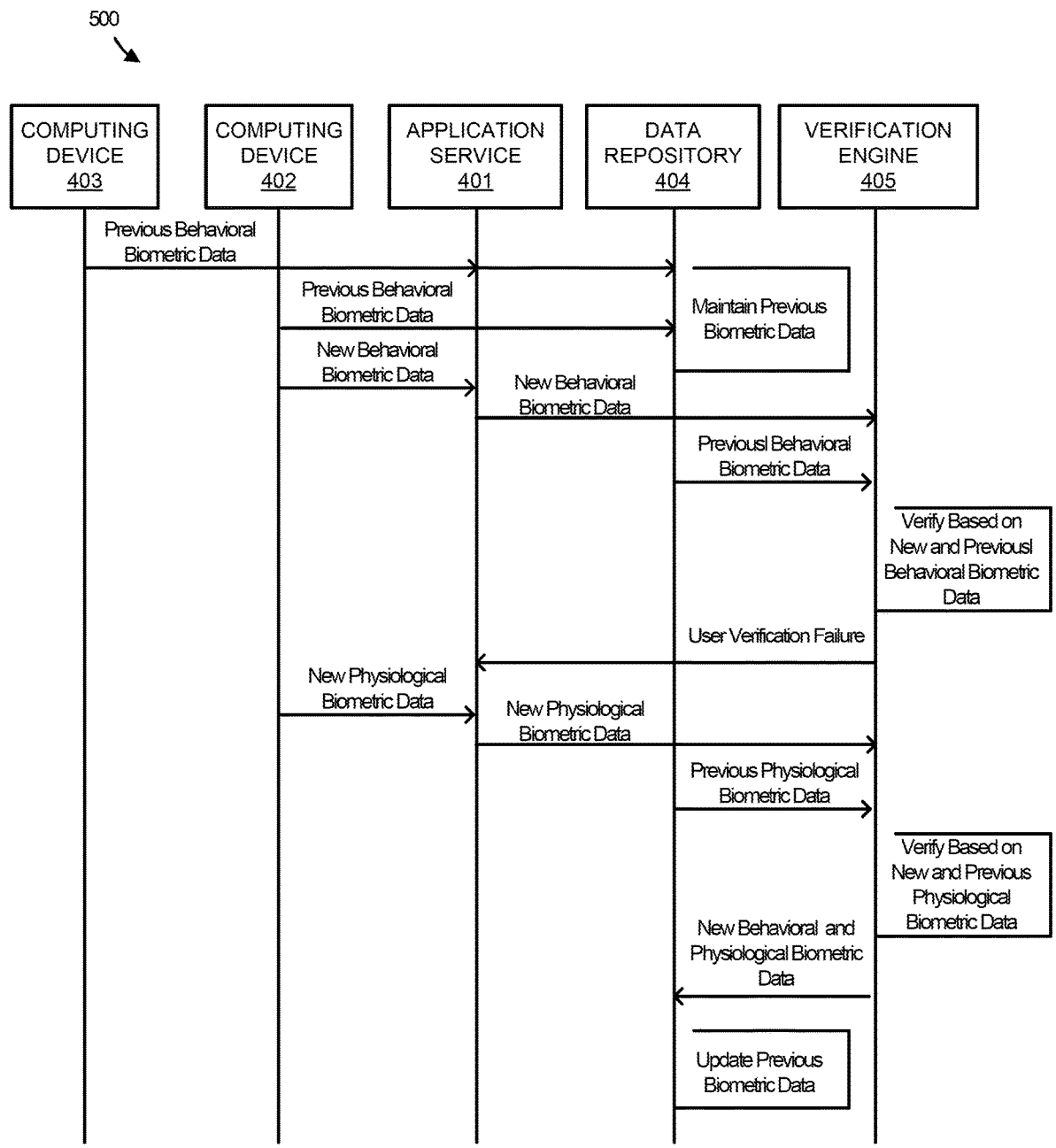
FIG. 5 illustrates a sequence diagram for a process to authenticate a user using biometric data, according to another example.

FIG. 5 illustrates a sequence diagram for process 500 to authenticate a user using biometric data, according to another example. Specifically, the sequence diagram illustrates an operation of system 400 to authenticate a user when biometric data is stored in a data repository and authorized using machine learning techniques in a verification engine.

In a first step, data repository 404 collects and maintains previous behavioral and physiological biometric data associated with the user's devices, such as computing device 402 and computing device 403. In a next step, application 401 collects new behavioral biometric data from computing device 402 and transfers the new behavioral biometric data to verification engine 404. The user may have logged-in and be in an active usage session. At some point during the active session, application 401 may determine that the identity of the user should be verified. In this example, the behavioral biometric data may be a user's battery usage pattern. For example, the user may have a pattern of plugging in their computing devices once a lower power warning has been displayed to the user. In other examples, the user may generally be plugged into a power supply during an active user session generally not be plugged into a power supply during an active user session. In other examples, the behavioral biometric data may be a manner in which the user opens an application or file, short-cut key usage, or other user device behavior data.

In a next step, the previous behavioral biometric data is retrieved from data repository 404 and sent to verification engine 405 to be processed using machine learning techniques. The previous behavioral biometric data is associated with the user and may be associated specifically with the user's behavior with computing device 402, or the user's behavior biometric data for a variety of computing devices, such as with both computing device 402 and computing device 403.

Verification engine 405 then compares the previous behavioral biometric data with the new behavioral biometric data received for the current user session. At this point, verification engine 405 may determine that the identity of the user is verified based on the behavioral biometric data. If the identity of the user is not verified, verification engine 405 indicates that additional biometric data should be used to verify the identity of the user.

In some examples, as the user is using computing device 402, a graph of the new behavioral biometric data is plotted against the previous behavioral biometric data and verification engine 405 compares the new plot with a pre-defined graph (e.g., defined from machine learning algorithms). In this example, a confidence score is determined based on the comparison of the new graph and the pre-defined graph. If the confidence score reaches threat threshold, then verification engine 405 may notify application service 401 or a third party and services running on the system may perform a mitigating action.

Application service 401 may then request additional biometric data. In this example, physiological biometric data is received by computing device 402 and communicated to verification engine 405 over application service 401. The physiological biometric data may include facial recognition data, fingerprint recognition data, voice recognition data, etc. In other examples, additional behavioral biometric data is received, such as a challenge to the user to open a file in a predicted manner.

In a next step, the new physiological biometric data is received by verification engine 405 to be processed using machine learning algorithms. Verification engine also receives previous physiological biometric data from data repository 404. The previous physiological biometric data is associated with the user and may be associated specifically with the user's physiological features received by computing device 402, or the user's physiological biometric data for a variety of computing devices, such as with both computing device 402 and computing device 403.

Verification engine 405 then compares the previous physiological biometric data with the new physiological biometric data received for the current user session. At this point, verification engine 405 may determine that the identity of the user is verified based on the physiological biometric data. If the identity of the user is not verified, verification engine 405 indicates that the user identity cannot be verified and that a mitigating factor should be performed. In a final operation, data repository 404 is sent the new behavioral biometric data and the new physiological biometric data and the previous biometric data sets are updated with the new biometric data sets associated with the user profile. The previous behavioral biometric data and the previous physiological biometric data may each be updated in association with computing device 402, computing device 403, or both.

In some examples, computing devices may generate user biometric data for artificial intelligence mechanisms on the device to validate. The artificial intelligence mechanisms may then maintain the user biometric data in the memory of the computing device for future authentications.

Figure 6:
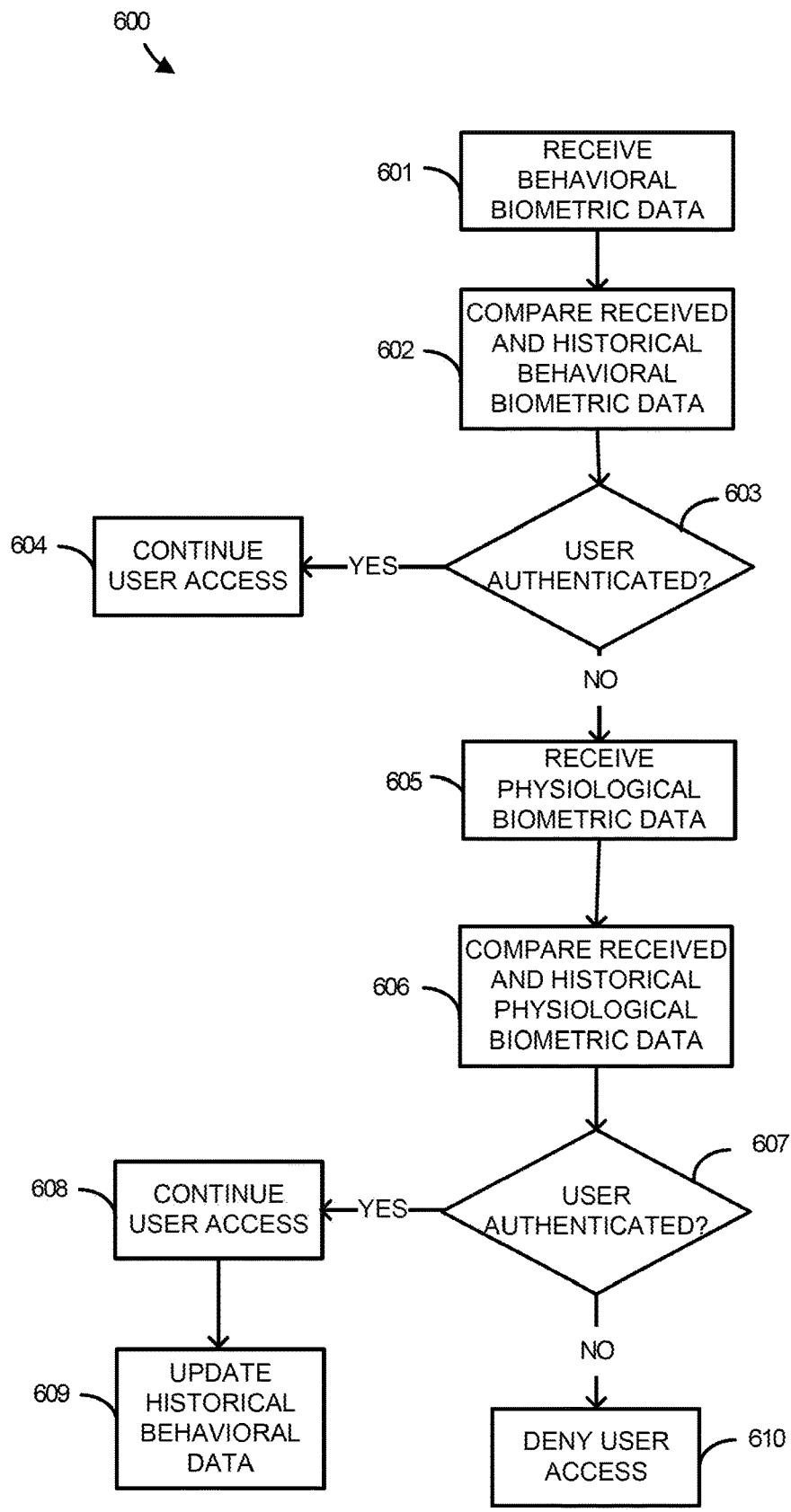
FIG. 6 is a flow diagram illustrating a process to authenticate a user based on biometric data, according to another example.

FIG. 6 is a flow diagram illustrating process 600 to authenticate a user based on biometric data, according to another example. Some or all of the steps of process 600 may be implemented in program instructions in the context of a component or components of an application used to carry out the user authentication feature. Although the flow diagram of FIG. 6 shows a specific order of execution, the order of execution may differ from that which is depicted. For example, the order of execution of two of more blocks shown in succession by be executed concurrently or with partial concurrence. All such variations are within the scope of the present disclosure.

In operation, a system receives (601) behavioral biometric data associated with a user of a computing device. In this example the behavioral data may be a manner in which the user launches an application or file, such as by double-clicking or by right-clicking and selecting an open command. The process then compares (602) the received behavior biometric data and historical behavioral biometric data associated with the user of the computing device. An identity of the user is then verified (603) based the comparison. If the identity of the user is verified, the user continues (604) their active session without further verification.

If the identity of the user is not authenticated based on the comparison of the received behavioral biometric data and the historical behavioral biometric data, the system receives (605) physiological biometric data associated with the user.

The system then compares (606) the received physiological biometric data and historical physiological biometric data associated with the user of the computing device. An identity of the user is then verified (607) based the comparison. If the identity of the user is verified, the user continues (608) their active session without further verification. At this point, the historical behavioral biometric data is updated (609) with the received behavioral biometric data.

If the identity of the user is not authenticated based on the comparison of the received physiological biometric data and the historical physiological biometric data, the system performs (610) a mitigating action on the computing device, such as denying the user access to continue their active session on the computing device. In other examples, a third party may be notified that the user's authentication has failed. In some examples, the third party may be an administrator of the user's account. The administrator may also be able to control the combination of biometric data verifications in which the user's identity is determined. It should be noted that at any step in the process, a user challenge may be sent to the user in addition to the passive user authentication processes, such as asking the user a secret question in response to a failure to verify the user's identity based on the behavioral biometric data, the physiological biometric data, or both.

FIG. 7 illustrates computing system 701, which is representative of any system or visual representation of systems in which the various applications, services, scenarios, and processes disclosed herein may be implemented. Examples of computing system 701 include, but are not limited to, server computers, rack servers, web servers, cloud computing platforms, and data center equipment, as well as any other type of physical or virtual server machine, container, and any variation or combination thereof. Other examples may include smart phones, laptop computers, tablet computers, desktop computers, hybrid computers, gaming machines, virtual reality devices, smart televisions, smart watches and other wearable devices, as well as any variation or combination thereof.

Computing system 701 may be implemented as a single apparatus, system, or device or may be implemented in a distributed manner as multiple apparatuses, systems, or devices. Computing system 701 includes, but is not limited to, processing system 702, storage system 703, software 705, communication interface system 707, and user interface system 709. Processing system 702 is operatively coupled with storage system 703, communication interface system 707, and user interface system 709.

Processing system 702 loads and executes software 705 from storage system 703. Software 705 includes process 706, which is representative of the processes discussed with respect to the preceding FIGS. 1-5, including process 200. When executed by processing system 702 to enhance an application, software 705 directs processing system 702 to operate as described herein for at least the various processes, operational scenarios, and sequences discussed in the foregoing examples. Computing system 701 may optionally include additional devices, features, or functionality not discussed for purposes of brevity.

Referring still to FIG. 7, processing system 702 may comprise a micro-processor and other circuitry that retrieves and executes software 705 from storage system 703. Processing system 702 may be implemented within a single processing device, but may also be distributed across multiple processing devices or sub-systems that cooperate in executing program instructions. Examples of processing system 702 include general purpose central processing units, graphical processing unites, application specific processors, and logic devices, as well as any other type of processing device, combination, or variation.

Storage system 703 may comprise any computer readable storage media readable by processing system 702 and capable of storing software 705. Storage system 703 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or other suitable storage media, except for propagated signals. Storage system 703 may be implemented as a single storage device, but may also be implemented across multiple storage devices or sub-systems co-located or distributed relative to each other. Storage system 703 may comprise additional elements, such as a controller, capable of communicating with processing system 702 or possibly other systems.

Software 705 may be implemented in program instructions and among other functions may, when executed by processing system 702, direct processing system 702 to operate as described with respect to the various operational scenarios, sequences, and processes illustrated herein. Software 705 may include program instructions for implementing process 200.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 705 may include additional processes, programs, or components, such as operating system software, virtual machine software, or other application software, in addition to or that include process 706. Software 705 may also comprise firmware or some other form of machine-readable processing instructions executable by processing system 702.

In general, software 705 may, when loaded into processing system 702 and executed, transform a suitable apparatus, system, or device (of which computing system 701 is representative) overall from a general-purpose computing system into a special-purpose computing system to enhance canvas service for graphically organizing content in a user interface. Indeed, encoding software 705 on storage system 703 may transform the physical structure of storage system 703. The specific transformation of the physical structure may depend on various factors in different examples of this description. Such factors may include, but are not limited to, the technology used to implement the storage media of storage system 703 and whether the computer-storage media are characterized as primary or secondary storage, as well as other factors.

If the computer readable storage media are implemented as semiconductor-based memory, software 705 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 707 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 709 may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 709. In some cases, the input and output devices may be combined in a single device, such as a display capable of displaying images and receiving touch gestures. The aforementioned user input and output devices are well known in the art and need not be discussed at length here. User interlace system 709 may also include associated user interface software executable by processing system 702 in support of the various user input and output devices discussed above.

Communication between computing system 701 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here.

Certain inventive aspects may be appreciated from the foregoing disclosure, of which the following are various examples.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. Those skilled in the art will understand and appreciate that a method could alternatively be represented as a series of interrelated states or events, such as in a state diagram. Moreover, not all acts illustrated in a methodology may be required for a novel example.

It is appreciated that examples described may include various components and features. It is also appreciated that numerous specific details are set forth to provide a thorough understanding of the examples. However, it is appreciated that the examples may be practiced without limitations to these specific details. In other instances, well known methods and structures may not be described in detail to avoid unnecessarily obscuring the description of the examples. Also, the examples may be used in combination with each other.

Reference in the specification to "an example" or similar language means that a particular feature, structure, or characteristic described in connection with the example is included in at least one example, but not necessarily in other examples. The various instances of the phrase "in one example" or similar phrases in various places in the specification are not necessarily all referring to the same example.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the scope of the disclosure. Thus, the present disclosure is not intended to be limited to the examples shown herein but is to be accorded the widest scope consistent with the principles and novel features disclosed herein.

What is claimed is:

1. A system comprising a processor operatively coupled with a computer readable storage media and program instructions stored on the computer readable storage media that, when read and executed by the processor, direct the processor to:

receive, from a biometric sensor, behavioral biometric data associated with a user of a computing device, wherein the received behavioral biometric data comprises at least one of keystroke dynamic data, mouse movement data, frequency of mouse usage data, or file launch data;

determine whether an identity of the user is authenticated based on a comparison of the received behavior biometric data and historical behavioral biometric data associated with the user of the computing device;

in response to determining that the identity of the user is not authenticated based on the comparison of the received behavioral biometric data and the historical behavioral biometric data, receive, from the biometric sensor, physiological biometric data associated with the user;

determine whether the identity of the user is authenticated based on a comparison of the received physiological biometric data and historical physiological biometric data associated with the user of the computing device; and in response to determining that the identity of the user is not authenticated based on the comparison of the received physiological biometric data and the historical physiological biometric data associated with the user of the computing device, performing a mitigating action on the computing device, wherein the mitigating action comprises a lock down of the computing device.

2. The system of claim 1 wherein, in response to determining that the identity of the user is authenticated based on the comparison of the received physiological biometric data and the historical physiological biometric data associated with the user of the computing device, the program instructions further direct the processor to update the historical behavioral biometric data with the received behavioral biometric data.

3. The system of claim 1 wherein the mitigating action comprises a notifying a third party of determination that the identity of the user is not authenticated.

4. The system of claim 1 wherein multiple user profiles are associated with the computing device and wherein the multiple user profiles each comprise historical behavioral biometric data and historical physiological biometric data associated with an individual user.

5. The system of claim 1 wherein the program instructions further direct the processor to maintain the historical behavioral biometric data and the historical physiological biometric data in a cloud-based data repository to be ingested by a machine learning system.

6. The system of claim 1 wherein the received physiological biometric data comprises at least one of facial recognition data, voice recognition data, or fingerprint recognition data.

7. A method comprising:
collecting behavioral biometric data associated with a user of a computing device, wherein the collected behavioral biometric data comprises at least one of keystroke dynamic data, mouse movement data, frequency of mouse usage data, or file launch data;
determining whether an identity of the user is verified based on a comparison of the collected behavior biometric data and historical behavioral biometric data associated with the user of the computing device;
in response to determining that the identity of the user is not verified based on the comparison of the collected behavioral biometric data and the historical behavioral biometric data, collecting physiological biometric data associated with the user;
determining whether the identity of the user is verified based on a comparison of the collected physiological biometric data and historical physiological biometric data associated with the user of the computing device;
in response to determining that the identity of the user is verified based on the comparison of the collected physiological biometric data and the historical physiological biometric data associated with the user of the computing device, updating the historical behavioral biometric data with the collected behavioral biometric data; and
in response to determining that the identity of the user is not authenticated based on the comparison of the received physiological biometric data and the historical physiological biometric data associated with the user of the computing device, performing a mitigating action on the computing device, wherein the mitigating action comprises a lock down of the computing device.

8. The method of claim 7 wherein multiple user profiles are associated with the computing device and wherein the multiple user profiles each comprise historical behavioral biometric data and historical physiological biometric data associated with an individual user.

9. The method of claim 7 further comprising maintaining the historical behavioral biometric data and the historical physiological biometric data in a cloud-based data repository to be ingested by a machine learning system.

10. The method of claim 7 wherein the collected physiological biometric data comprises at least one of facial recognition data, voice recognition data, or fingerprint recognition data.

11. A non-transitory machine-readable storage medium comprising executable instructions, that when executed cause a processor to:
maintain historical behavioral biometric data and historical physiological biometric data in a cloud-based data repository to be ingested by a machine learning system;
receive behavioral biometric data associated with a user of a computing device wherein the received behavioral biometric data comprises at least one of keystroke dynamic data, mouse movement data, frequency of mouse usage data, or file launch data;
determine whether an identity of the user is confirmed based on a comparison of the received behavior biometric data and the historical behavioral biometric data associated with the user of the computing device;
receive physiological biometric data associated with the user;
determine whether the identity of the user is confirmed based on a comparison of the received physiological biometric data and the historical physiological biometric data associated with the user of the computing device; and
in response to determining that the identity of the user is not authenticated based on the comparison of the received physiological biometric data and the historical physiological biometric data associated with the user of the computing device, performing a mitigating action on the computing device, wherein the mitigating action comprises a lock down of the computing device.

12. The method of claim 7 wherein the behavioral biometric data is collected from a biometric sensor associated with the computing device.

13. The machine-readable storage medium of claim 11 wherein the behavioral biometric data is received from a biometric sensor associated with the computing device.

14. The machine-readable storage medium of claim 11 wherein the mitigating action comprises a notifying a third party of determination that the identity of the user is not confirmed.

15. The machine-readable storage medium of claim 11 wherein the received physiological biometric data comprises at least one of facial recognition data, voice recognition data, or fingerprint recognition data.

* * * * *